US008855214B2

(12) United States Patent
Faroudja

(10) Patent No.: US 8,855,214 B2
(45) Date of Patent: Oct. 7, 2014

(54) MULTIDIMENSIONAL VIDEO PROCESSING

(71) Applicant: Faroudja Enterprises Inc., Los Altos, CA (US)

(72) Inventor: Yves Faroudja, Los Altos, CA (US)

(73) Assignee: Faroudja Enterprises, Inc., Los Altos, CA (US)

(*) Notice: Subject to any disclaimer, the term of this patent is extended or adjusted under 35 U.S.C. 154(b) by 0 days.

(21) Appl. No.: 13/860,635

(22) Filed: Apr. 11, 2013

(65) Prior Publication Data

US 2014/0219366 A1 Aug. 7, 2014

Related U.S. Application Data

(60) Provisional application No. 61/760,277, filed on Feb. 4, 2013, provisional application No. 61/765,891, filed on Feb. 18, 2013.

(51) Int. Cl.
*H04N 7/26* (2006.01)
*H04N 19/80* (2014.01)

(52) U.S. Cl.
CPC ................................ *H04N 19/0089* (2013.01)
USPC ...................................... 375/240.29; 375/240

(58) Field of Classification Search
USPC ........... 348/97, 446, 607; 375/240.01–240.29
See application file for complete search history.

(56) References Cited

U.S. PATENT DOCUMENTS

| 5,734,419 | A | * | 3/1998 | Botsford et al. | 348/97 |
| 5,822,008 | A | * | 10/1998 | Inoue et al. | 348/446 |
| 5,926,220 | A | * | 7/1999 | Linzer | 375/240.25 |
| 6,037,986 | A | * | 3/2000 | Zhang et al. | 375/240.12 |
| 6,285,716 | B1 | * | 9/2001 | Knee et al. | 375/240.28 |
| 7,684,626 | B1 | * | 3/2010 | Cote et al. | 375/240.29 |
| 2003/0227977 | A1 | * | 12/2003 | Henocq | 375/240.26 |
| 2005/0036558 | A1 | * | 2/2005 | Dumitras et al. | 375/240.29 |
| 2009/0034622 | A1 | * | 2/2009 | Huchet et al. | 375/240.16 |
| 2010/0278231 | A1 | * | 11/2010 | Gutman et al. | 375/240.02 |
| 2011/0019094 | A1 | * | 1/2011 | Rossignol et al. | 348/607 |
| 2011/0103464 | A1 | * | 5/2011 | Zheng et al. | 375/240.02 |
| 2013/0195207 | A1 | * | 8/2013 | Xue et al. | 375/240.29 |

OTHER PUBLICATIONS

U.S. Appl. No. 13/860,625, filed Apr. 11, 2013, entitled, "Progressive Scan Video Processing."

* cited by examiner

*Primary Examiner* — Dave Czekaj
*Assistant Examiner* — Shanika Brumfield
(74) *Attorney, Agent, or Firm* — Covergent Law Group LLP

(57) ABSTRACT

A method and system for multidimensional video processing comprises preprocessing a video signal in at least two of horizontal, vertical and temporal dimensions of the video signal to reduce an amount of information of the video signal to obtain an information-reduced signal and filtered components that are separated from the video signal; and using the information-reduced signal to generate simulated filtered components, and generating support signals based on a difference between the filtered components and the simulated filtered components.

26 Claims, 5 Drawing Sheets

Postprocessor 600

MULTIDIMENSIONAL VIDEO PROCESSING

CROSS-REFERENCE TO RELATED APPLICATIONS

This application claims the benefit of provisional Patent Application Ser. No. 61/760,277, filed Feb. 4, 2013; and provisional Patent Application Ser. No. 61/765,891, filed Feb. 18, 2013, both assigned to the assignee of the present application, and incorporated herein by reference.

According to one aspect of the exemplary embodiment, where combining the information-reduced video signal 206 and the support signals 208, the postprocessor 210 performs the same combination of horizontal, vertical, and temporal processing performed by the preprocessor 204, but in reverse order.

BACKGROUND

In progressive video scanning, successive scanning lines are vertically aligned from frame to frame. For example, in the 1080p/60 standard (1080 scanning lines per frame, 60 frames per second) line 1 of frame 2 is scanned at the same vertical location as is line 1 of frame 1, and so are lines 1 of frames 3, 4, etc.

An interlaced signal comprises a succession of even and odd fields, 2 successive fields making a frame. For example, in the 1080i/60 standard (1080 lines interlaced, 60 fields per second), each field is composed of 540 lines, and there are 60 fields or 30 frames per second. A frame comprises one even field and one odd field in succession. For interlaced video, line 1 of field 2 will be vertically located between line 1 and line 2 of field 1, and so will be line 1 of field 4, while line 1 of field 3 will be vertically co-incident with line 1 of field 1.

A progressive scan signal comprises horizontal lines drawn consecutively in sequence. Reference may be made to "even" and "odd" lines of a progressive scan video signal, where even lines may comprise the second line in every other consecutive line (i.e., lines 2, 4, 6 etc.), while odd lines comprise the first line and every other consecutive line (i.e., lines 1, 3, 5, etc.). In cases in which a progressive scan video signal is derived from an interlaced scan video signal, even lines may be referred to being derived from even fields, and the odd lines may be referred to being derived from odd fields.

Interlaced video has been used since the early days of television, and has been slowly fallen into disfavor, and replaced by progressive scan for more and more applications, mostly because of the specific needs of computer or computer-like displays. More recent television displays such as LCDs or DLPs, can only be driven with a progressive scan. In these cases, interlaced signals have to be de-interlaced, which is costly and difficult.

The main advantages of progressive scan (as compared to interlaced scanning) are 1) the absence of interlace artifacts, such as line twitter, serrations, flicker and the like, 2) ease of processing from a camera to a display, and 3) ease of digital processing, such as bandwidth or bit-recompression. The main disadvantage of progressive scan is an increase by a ratio of two of bandwidth requirements as compared to an interlaced standard having the same field rate as the comparable progressive scan standard.

Digital compression systems require a high bit count (equivalent to large bandwidth) to process a progressive scan video signal with an acceptable quality. The requirements for bandwidth are increasing daily, and the available bandwidth provided by present communication channels is limited. Already, more than 50% of the Internet traffic is occupied by video.

Broadcasters are no longer satisfied with present HDTV standards (1080i and 720p) it would like to move to higher scan rates (e.g., "4K" which is approximately 2000×4000 pixels) or higher frame rates (e.g., 120 Hz). Furthermore, interlaced standards, which in the past employed analog transmission, reduced the bandwidth requirements by two but at the cost of image quality (artifacts). Interlacing does not present such an advantage in compression systems and is not computer-friendly.

Compression standards are slowly improving, becoming more efficient in packing increasing data loads into increasingly over-worked channels, but an improvement by a ratio of two in bandwidth utilization (Mb/s for a constant channel) occurs only every 8 to 10 years or so.

A need has arisen, therefore, to reduce the bandwidth requirements of a transmitting video signals by reducing the amount of information presented to the transmission path without degrading the image quality.

BRIEF SUMMARY

Exemplary embodiments provide methods and systems for multidimensional video processing comprises preprocessing a video signal in at least two of horizontal, vertical and temporal dimensions of the video signal to reduce an amount of information of the video signal to obtain an information-reduced signal and filtered components that are separated from the video signal; and using the information-reduced signal to generate simulated filtered components, and generating support signals based on a difference between the filtered components and the simulated filtered components.

Exemplary embodiments further provide a method for multidimensional postprocessing, comprising: receiving an information-reduced signal, the information-reduced video signal having been generated by a preprocessor that processed a video signal in at least two of horizontal, vertical and temporal dimensions of the video signal to reduce an amount of information of the video signal to obtain the information-reduced signal and filtered components that are separated from the video signal; and using the information-reduced signal to generate the simulated filtered components, and then combining the simulated filtered components with the support signals to generate the full information duplicate of the video signal.

DETAILED DESCRIPTION

The exemplary embodiments relate to multidimensional video processing. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components that those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Figure 1:
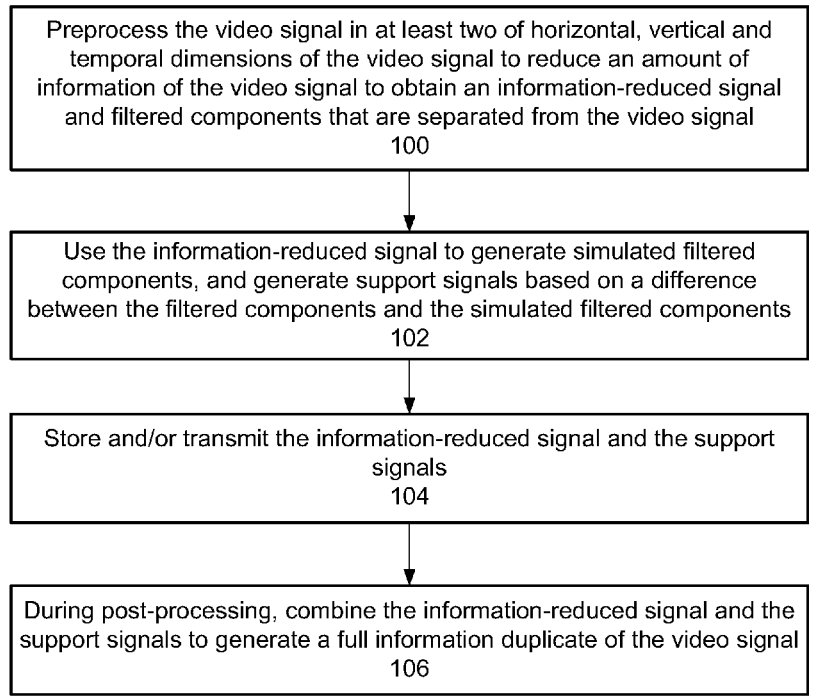
FIG. 1 is a flow chart illustrating a process for multidimensional processing of a video signal in order to reduce bandwidth requirements for storage and/or transmission of the video signal.

FIG. 1 is a flow chart illustrating a process for multidimensional video processing in order to reduce bandwidth requirements for storage and/or transmission of a video signal. The process may begin by preprocessing the video signal in at least two of horizontal, vertical and temporal dimensions of the video signal to reduce an amount of information of the video signal to obtain an information-reduced signal and filtered components that are separated from the video signal (block 100).

In one embodiment, the combination of processing in at least two horizontal, vertical, and temporal dimensions may produce corresponding horizontal, vertical and temporal filtered components that are separated from video signal.

The information-reduced signal is used to generate synthetic or simulated filtered components, and support signals are generated based on a difference between the filtered components and the simulated filtered components (block 102). In one embodiment, the support signals may be generated in the at least two of the horizontal, vertical and temporal dimensions.

The information-reduced signal and the support signals may then be stored in a storage medium and/or transmitted (block 104). Because the information-reduced signal contains less overall information than the original video signal and the support signals contain only the difference between the filtered components of the video signal and the simulated filtered components, the process conserves information required to store and/or transmit the full information of the original video signal.

During post-processing, the information-reduced signal and the support signals are combined to generate a full information duplicate of the video signal (block 106). More specifically, a postprocessor receives the information-reduced signal and the support signals and may use the information-reduced signal to generate the simulated filtered components. The postprocessor may then combine the simulated filtered components with the support signals to obtain estimated filtered components that estimate the filtered components that were separated from the original video signal. The estimated filtered components may be then added back to the information-reduced signal to generate the full information duplicate of the video signal.

Figure 2:
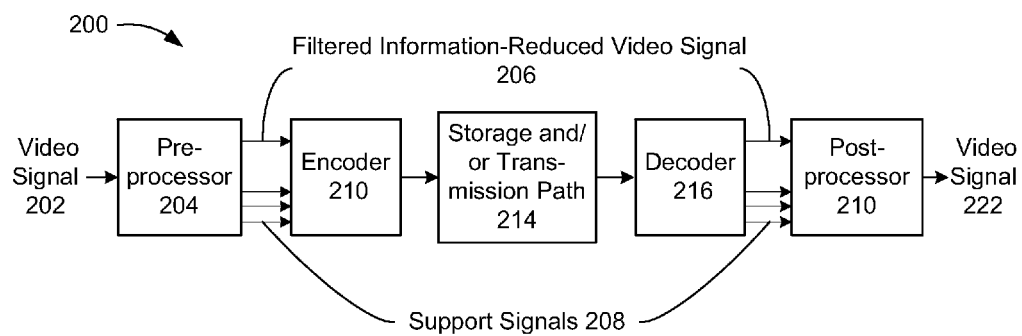
FIG. 2 is a block diagram illustrating a multidimensional video processing system for implementing the process of FIG. 1.

FIG. 2 is a block diagram illustrating a multidimensional video processing system for implementing the process of FIG. 1. According to one exemplary embodiment the multidimensional video processing system 200 may include a preprocessor 204, an encoder 210, a storage and/or transmission path 214, a decoder 216, and a postprocessor 210. The preprocessor 204 performs multidimensional video processing on a video signal 202 to reduce the amount of information to be stored and/or transmitted. In one embodiment, the preprocessor 204 may be coupled to a memory (not shown) to facilitate the storage and/or transmission. The postprocessor 210 processes the stored and/or transmitted information after reception to create a duplicate video signal 222.

In operation, the preprocessor 204 receives a video signal 202 and generates a filtered information-reduced video signal 206. The filtered bandwidth-reduce video signal 206 may be generated by performing a least two of the following types of filtering in series: 1) horizontally low-pass filtering the video signal, for example, at ½ the upper bandwidth limit of the signal; 2) vertically processing the video signal, for example by eliminating 1 line out of 2 or low-pass filtering in the vertical domain; and 3) processing the video signal in the time domain, for example, by eliminating 1 frame out of 2.

In one embodiment, the video signal 202 may be preprocessed by performing any combination of horizontal, vertical, and temporal filtering on the video signal 202 in series and in any order as long as at least two types of filtering is performed. The combination of horizontal, vertical, and temporal filtering produces corresponding horizontal, vertical and temporal filtered components that are separated from the resulting filtered information-reduced video signal 206.

The preprocessor 204 uses the filtered information-reduced video signal and the corresponding horizontal, vertical and temporal filtered components to generate at least two corresponding support signals 208, a horizontal support signal, a vertical support signal, and a temporal support signal. The preprocessor 204 uses the filtered information-reduced video signal 206 to generate at least two corresponding simulated horizontal, vertical and temporal filtered components. The preprocessor 204 then generates a corresponding horizontal support signal, a vertical support signal, and a temporal support signal based on a difference between the corresponding horizontal, vertical and temporal filtered components and the corresponding simulated horizontal, vertical and temporal filtered components, respectively, as explained further below.

The preprocessor 204 passes the filtered information-reduced video signal 206 and the support signals 208 to the encoder 210 for encoding. The encoded filtered information-reduced video signal and the support signals are then sent to a storage and/or transmission path 214.

After access and/or reception from the storage and/or transmission path 214, the encoded filtered information-reduced video signal and the support signals are decoded by a decoder 216 to reproduce the filtered information-reduced video signal 206 and the support signals 208.

The postprocessor 210 receives the filtered information-reduced video signal and at least two of the horizontal support signal, the vertical support signal, and the temporal support signal. The postprocessor 210 uses the information-reduced video signal 206 to generate at least two corresponding simulated horizontal, vertical and temporal filtered components. The postprocessor 210 combines information-reduced signal, the simulated horizontal, vertical and temporal filtered components with the corresponding horizontal support signal, the vertical support signal, and the temporal support signal to obtain estimated filtered components that were separated from the original video signal 222. The postprocessor 210 adds the estimated filtered components back to the information-reduced video signal 206 to generate a full information duplicate copy of the original video signal 222.

According to one aspect of the exemplary embodiment, where combining the information-reduced video signal 206 and the support signals 208, the postprocessor 210 performs the same combination of horizontal, vertical, and temporal processing performed by the preprocessor 204, but in reverse order.

Figure 3:
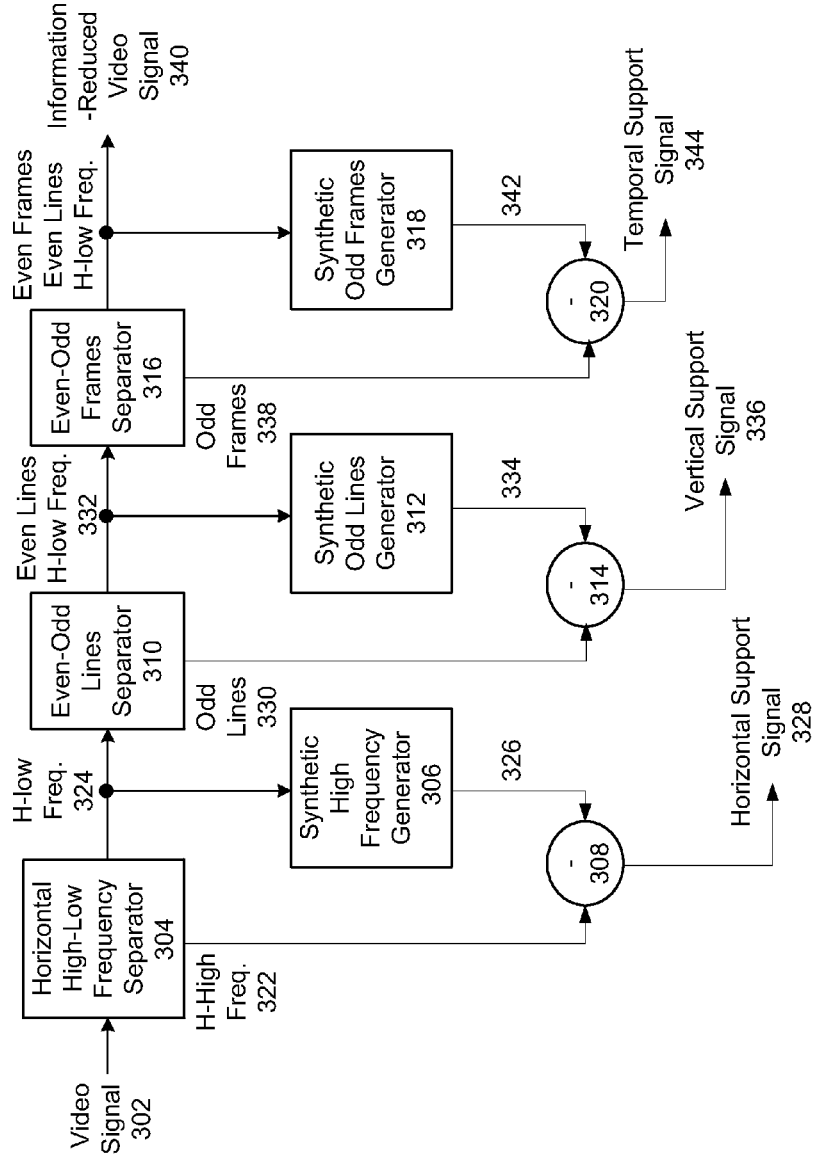
FIG. 3 is a diagram of a preprocessor that performs multidimensional video processing in the horizontal, vertical and temporal domains in serial, and where vertical filtering comprises an even and odd lines separator.
Figure 5:
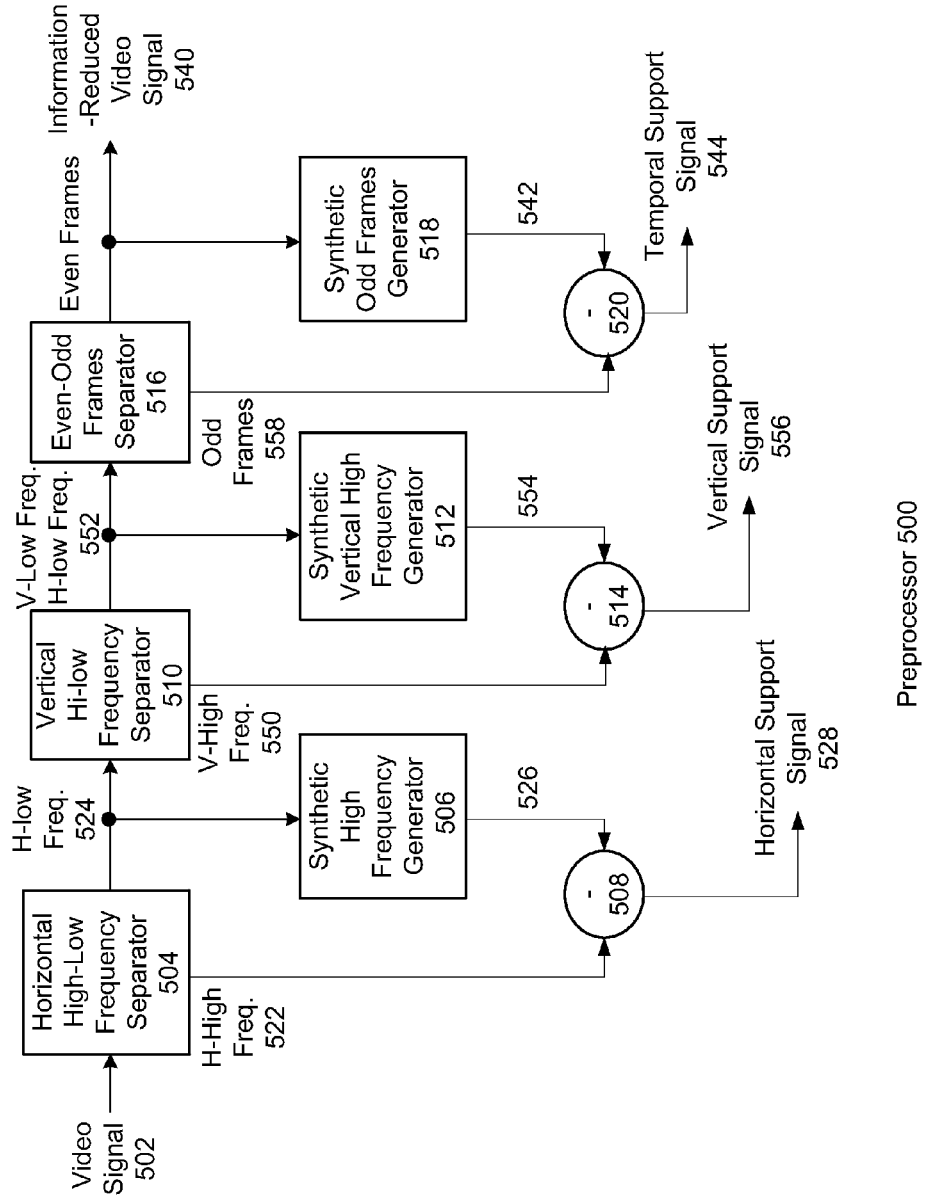
FIG. 5 is a diagram of a preprocessor that performs multidimensional video processing in the horizontal, vertical and temporal domains in serial, and where vertical filtering comprises a vertical high-low-frequency separator.

According to aspect of exemplary embodiment, the multi-dimensional video processing may be implemented using two embodiments for the vertical filtering, one in which even and odd lines from the video signal are separated, and one in which vertical high and low vertical frequencies from the video signal are separated, as shown in FIGS. 3 and 5, respectively.

FIG. 3 is a diagram of a preprocessor that performs multi-dimensional video processing in the horizontal, vertical and temporal domains in serial, and where vertical filtering comprises an even and odd lines separator. The preprocessor 300 reduces the amount of information of an input video signal 302 and outputs an information-reduced video signal 340 and up to three support signals, a horizontal support signal 328, a vertical support signal 336, and a temporal support signal 344.

In this embodiment, the preprocessor 300 may comprise a horizontal high-low-frequency separator 304, a synthetic high frequency generator 306, a subtractor 308, an even-odd lines separator 310, a synthetic odd lines generator 312, a subtractor 314, an even-odd frames separator 316, a synthetic frames generator 318, and a subtractor 320.

The horizontal high-low frequency separator 304 separates horizontal high and low frequencies from the video signal 302. In one embodiment, the horizontal high-low frequency separator 304 horizontally low-pass filters the video signal, for example, at ½ an upper bandwidth limit of the video signal 302. The outputs of the horizontal high-low frequency separator 304 comprise horizontal-high frequencies 322 (a filtered component) and horizontal-low frequencies 324 of the information-reduced video signal.

The synthetic high frequency generator 306 receives the horizontal-low frequencies 324 and generates synthetic or simulated high frequencies 326 from the horizontal-low frequencies 324. The subtractor 308 receives the horizontal-high frequencies 322 and the simulated high frequencies 326, and subtracts from the horizontal-high frequencies 322 the simulated high frequencies 326. The output of the subtractor 308 is a horizontal support signal (horizontal high frequencies—simulated high frequencies) 328.

The even-odd lines separator 310 receives the horizontal-low frequencies 324 from the horizontal high-low-frequency separator 304 and separates even and odd lines of the video signal. In one embodiment, the even-odd lines separator 310 vertically filters the video signal, for example by eliminating 1 line out of 2. The output of the even-online separator 310 comprises odd lines 330 (a filtered component) and the even lines of horizontal-low frequencies 332 (alternatively referred to as low-pass filtered, even lines) of the information-reduced video signal.

The synthetic odd lines generator 312 receives the even lines of horizontal-low frequencies 332 and generates simulated odd lines 334. The subtractor 334 receives the odd lines 330 and subtracts from the odd lines 330 the simulated odd lines 334. The output of the subtractor 314 is a vertical support signal (odd lines—simulated odd lines) 336.

The even-odd frames separator 316 receives the even lines of horizontal-low frequencies 332 from the even-odd lines separator 310 and separates even and odd frames of the video signal, where the odd frames comprise the filtered component. In one embodiment, the even-odd frames separator 316 processes the video signal in the time domain, for example, by eliminating 1 frame out of 2. The output of the even-odd frames separator 316 comprises the information-reduced video signal 340 comprising even frames and even lines of horizontal-low frequencies.

The synthetic odd frames generator 318 receives the information-reduced video signal 340 from the even-odd frames separator 316 and generates simulated odd frames 342. The subtractor 320 receives the odd frames 338 from the even-odd frames separator 316 and subtracts from the odd frames 338 the simulated odd frames from the synthetic odd frames generator 318. The output of the subtractor 320 comprises a temporal support signal (odd frames—simulated odd frames) 344.

Figure 4:
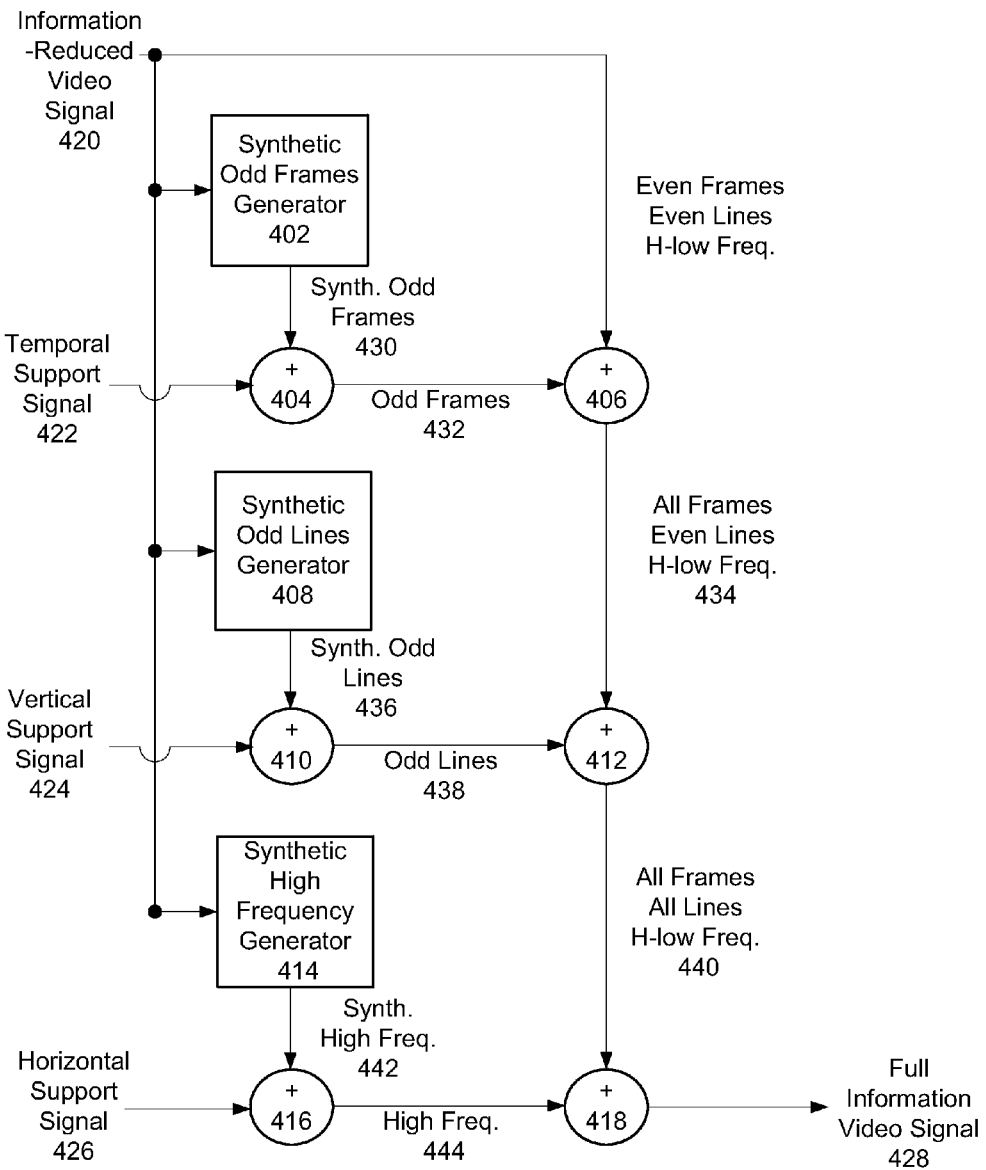
FIG. 4 is a diagram showing details of a postprocessor corresponding to the preprocessor of FIG. 3.

FIG. 4 is a diagram showing details of a postprocessor corresponding to the preprocessor of FIG. 3. In one embodiment, the postprocessor 400 performs multidimensional postprocessing and may include a synthetic odd frames generator 402, adder 404, adder 406, a synthetic odd lines generator 408, adder 410, adder 412, a synthetic horizontal high frequency generator 414, adder 416, and adder 418.

The postprocessor 400 may receive up to four signals from the decoder 216 of FIG. 2: an information-reduced video signal 420 comprising even frames, even lines and horizontal low frequencies; a temporal support signal 422 comprising (odd frames—simulated odd frames) and having only even lines and horizontal low frequencies; a vertical support signal 424 comprising (odd lines—simulated odd lines) and having only horizontal low frequencies; and a horizontal support signal 426 comprising (horizontal high frequencies—horizontal simulated high frequencies).

The synthetic odd frames generator 402 may comprise a simulated odd frames generator that may be substantially identical in structure and function to the synthetic odd frames generator 318 of FIG. 3. The synthetic odd frames generator 402 receives the information-reduced video signal 420 and generates synthetic odd frames 430. The adder 404 receives and adds the synthetic odd frames 430 (low pass filtered and having only even lines) and the temporal support signal 422 (odd frames—simulated odd frames) to output estimated odd frames 432 to the adder 406. The adder 406 adds the information-reduced video signal 420 and the estimated odd frames 432 to output a video signal 434 having full frames sequences, and only even lines and horizontal low frequencies.

The synthetic odd lines generator 408 may comprise a simulated odd lines generator that may be substantially identical in structure and function to the synthetic odd lines generator 312 of FIG. 3. The synthetic lines generator 312 receives the information-reduced video signal 420 and generates synthetic odd lines 436. The adder 410 receives and adds the synthetic odd lines 436 (horizontally low-pass filtered) and the vertical support signal 424 (odd lines—simulated odd lines) to output estimated odd lines 438 to the adder 412. The adder 412 receives and adds the video signal 434 and the estimated odd lines 438 to output a video signal 440 having a full frame sequence, all lines, and only horizontal low frequencies.

The synthetic horizontal high frequency generator 414 may comprise a simulated high frequencies generator that may be substantially identical to the synthetic high frequency generator 306 of FIG. 3. The synthetic horizontal high frequency generator 414 receives the information-reduced video signal 420 and generates synthetic high frequencies 442. The adder 416 receives and adds the synthetic high frequencies 442 and the horizontal support signal 426 (high frequencies—simulated high frequencies) and outputs estimated high frequencies 444 to the adder 418. The adder 418 receives and adds the video signal 440 and the estimated high frequencies 444 to output a video signal 420 with full information having all lines and frames, and which may be substantially similar to the input video signal 302 of FIG. 3.

FIG. 5 is a diagram of a preprocessor that performs multidimensional video processing in the horizontal, vertical and temporal domains in serial, and where vertical filtering comprises a vertical high-low-frequency separator 510. The preprocessor 500 reduces the amount of information of an input video signal 502 and outputs an information-reduced video signal 540 and up to three support signals, a horizontal support signal 528, a vertical support signal 556, and a temporal support signal 544.

In this embodiment, the preprocessor 200 comprises a horizontal high-low-frequency separator 504, a synthetic high frequency generator 506, a subtractor 508, vertical high-low-frequency separator 510, a synthetic vertical high frequencies generator 512, a subtractor 514, an even-odd frames separator 516, a synthetic frames generator 518, and a subtractor 520.

The horizontal high-low frequency separator 504 separates horizontal high and low frequencies from the video signal 502. In one embodiment, the horizontal high-low frequency separator 504 horizontally low-pass filters the video signal, for example, at ½ an upper bandwidth limit of the video signal 502. The output of the horizontal high-low frequency separator 504 comprises horizontal-high frequencies 522 and horizontal-low frequencies 524.

The synthetic high frequency generator 506 receives the horizontal-low frequencies 524 and generates synthetic or simulated high frequencies 526 from the horizontal-low frequencies 524. The subtractor 508 receives the horizontal-high frequencies 522 and the simulated high frequencies 526, and subtracts from the horizontal-high frequencies 522 the simulated high frequencies 526. The output of the subtractor 508 is a horizontal support signal (horizontal high frequencies—simulated high frequencies) 528.

The vertical high-low-frequency separator 510 receives the horizontal-low frequencies 524 from the horizontal high-low-frequency separator 504 separates high and low vertical frequencies of the video signal. In one embodiment, the vertical high-low-frequency separator 510 vertically processes the video signal, for example by eliminating high vertical frequencies to produce vertical low frequencies. The output of the vertical high-low-frequency separator 510 comprises vertical high frequencies 550 and vertical frequencies 552 having vertical low and horizontal-low frequencies (alternatively referred to as low-pass filtered, vertical low-frequencies).

The synthetic vertical high frequency generator 512 receives the vertical low frequencies 552 and generates simulated high vertical frequencies 554. The subtractor 514 receives the vertical high frequencies 550 and subtracts from the vertical high frequencies 550 the simulated high vertical frequencies 554. The output of the subtractor 514 is a vertical support signal 556 v (high vertical frequencies—simulated high vertical frequencies).

The even-odd frames separator 516 receives the vertical frequencies 552 from the even-odd lines separator 510 and separates even and odd frames of the video signal. In one embodiment, the even-odd frames separator 516 processes the vertical frequencies 552 video signal in the time domain, for example, by eliminating 1 frame out of 2. The output of the even-odd frames separator 516 comprises the information-reduced video signal 540 comprising even frames and vertical low and horizontal-low frequencies.

The synthetic frames generator 518 receives the information-reduced video signal 540 from the even-odd frames separator 516 and generates simulated odd frames 542. The subtractor 520 receives the odd frames 558 from the even-odd frames separator 516 and subtracts from the odd frames 558 the simulated odd frames from synthetic frames generator 518. The output of the subtractor 520 comprises a temporal support signal (odd frames—simulated odd frames) 544.

Referring again to FIG. 2, in one embodiment the preprocessor 204 could be the preprocessor 500 of FIG. 5. The encoder receives the four outputs of the preprocessor 500 and transmits four outputs, similar to the preprocessor outputs, to the decoder. The postprocessor receives the four outputs from the decoder, and delivers a full information video signal similar to the video signal at the input of the preprocessor.

Figure 6:
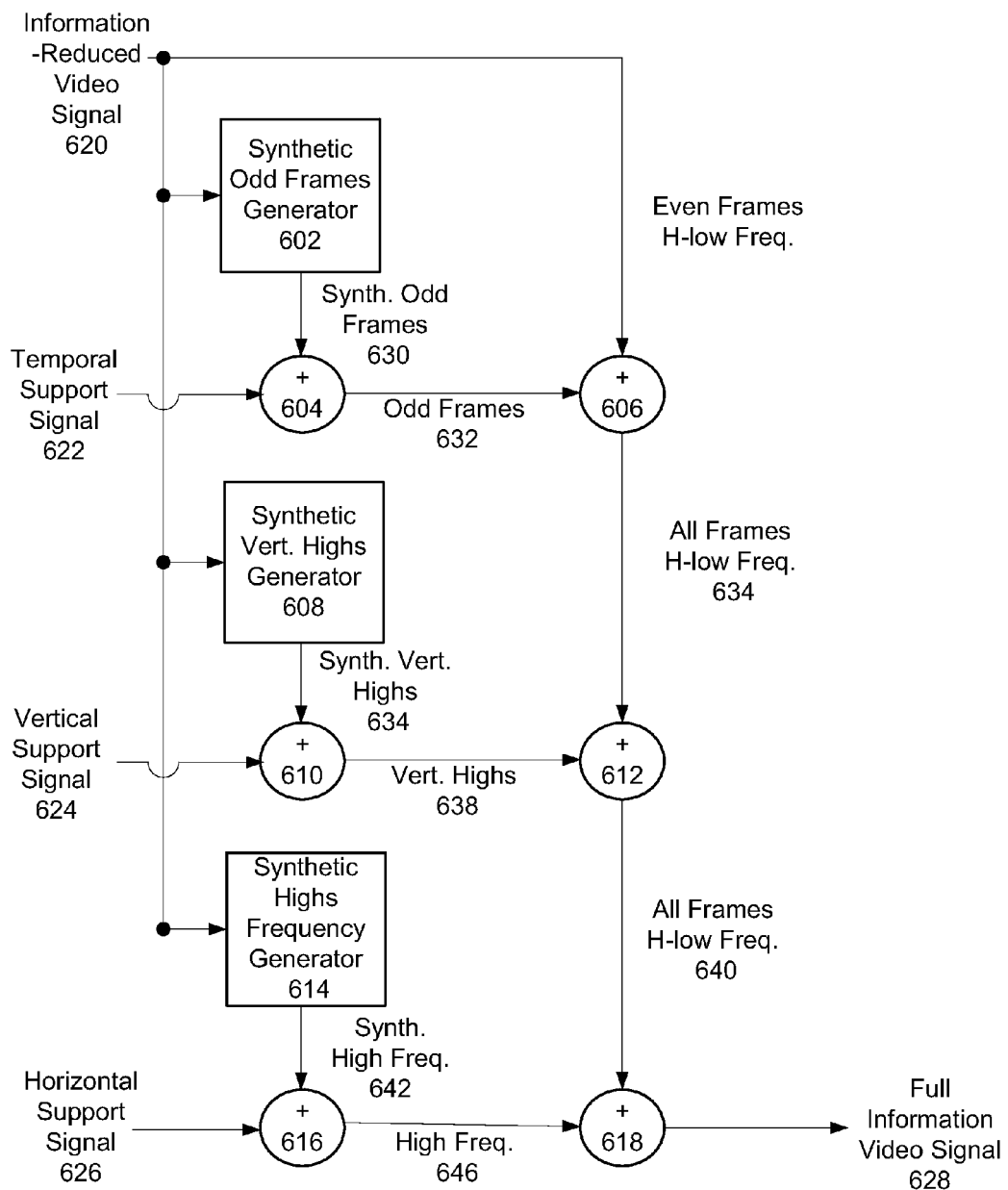
FIG. 6 is a diagram showing details of a postprocessor corresponding to the preprocessor of FIG. 5.

FIG. 6 is a diagram showing details of a postprocessor corresponding to the preprocessor of FIG. 5. In one embodiment, the postprocessor 600 performs multidimensional post-processing and may include a synthetic odd frames generator 602, adder 604, adder 606, a synthetic vertical high frequency generator 608, adder 610, adder 612, a synthetic horizontal highs frequency generator 614, adder 616, and adder 618.

The postprocessor 600 may receive up to four signals from the decoder 216 of FIG. 2: an information-reduced video signal 620 comprising even frames, vertical low and horizontal low frequencies; a temporal support signal 622 comprising (odd frames—simulated odd frames) and having only even lines and horizontal low frequencies; a vertical support signal 624 comprising (vertical high frequencies—vertical simulated high frequencies) and having only horizontal low frequencies; and a horizontal support signal 626 comprising (horizontal high frequencies—horizontal simulated high frequencies).

The synthetic odd frames generator 602 may comprise a simulated odd frames generator that may be substantially identical in structure and function to the synthetic frames generator 318 of FIG. 3. The synthetic odd frames generator 602 receives the information-reduced video signal 620 and generates synthetic odd frames 630. The adder 604 receives and adds the synthetic odd frames 630 horizontally (low pass filtered and having only low vertical frequencies) and the temporal support signal 622 (odd frames—simulated odd frames) to output estimated odd frames 632 to the adder 606. The adder 606 adds the information-reduced video signal 620 and the estimated odd frames 632 to output a video signal 636 having full frames sequences, and only vertical and horizontal low frequencies.

The synthetic vertical high frequency generator 608 may comprise a simulated vertical high frequency generator that may be substantially identical in structure and function to the synthetic vertical high frequency generator 512 of FIG. 5. The synthetic vertical high frequency generator 608 receives the information-reduced video signal 620 and generates simulated high vertical frequencies 634. The adder 610 receives and adds the synthetic simulated high vertical frequencies 634 (horizontally low-pass filtered) and the vertical support signal 626 (vertical high frequencies—simulated vertical high frequencies) to output estimated vertical high frequencies 638 to the adder 612. The adder 612 receives and adds the video signal 634 and the estimated vertical high frequencies 638 to output a video signal 640 having a full frame sequence, all lines, and only horizontal low frequencies.

The synthetic horizontal high frequency generator 614 may comprise a simulated high frequency generator that may be substantially identical to the synthetic high frequency generator 506 of FIG. 5. The synthetic horizontal high frequency generator 614 receives the information-reduced video signal 620 and generates synthetic horizontal high frequencies 642. The adder 616 receives and adds the synthetic high frequencies 642 and the horizontal support signal 626 (high frequencies—simulated high frequencies) and outputs estimated high frequencies 646 to the adder 618.

The adder 618 receives and adds the video signal 640 (horizontal low frequencies on all lines and frames) and the estimated high frequencies 646 (reconstituted horizontal high frequencies on all frames and lines) to output a video signal 628 with full integrity in all dimensions similar to the input video signal 502 of FIG. 5.

A method and system for multidimensional video processing has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable storage medium such as memory, a hard disk, or a CD/DVD-ROM and is to be executed by at least processor. The software could also be transmitted via a computer-readable transmission medium. Accordingly, many modifications may be made by one of ordinary skill in the art without departing from the spirit and scope of the appended claims.

I claim:

1. A method for multidimensional video processing, the method comprising:
   preprocessing a video signal in at least one of a horizontal dimension and a vertical dimension, and preprocessing the video signal in a temporal dimensions to reduce an amount of information of the video signal to obtain an information-reduced signal and filtered components that are separated from the video signal; and
   using the information-reduced signal to generate simulated filtered components, and generating support signals based on a difference between the filtered components and the simulated filtered components;
   wherein the preprocessing in the horizontal dimension comprises:
      separating horizontal high and low frequencies from the video signal by horizontally low-pass filtering the video signal,
      outputting the information-reduced signal as horizontal-low frequencies, and outputting a horizontal filtered component comprising horizontal-high frequencies,
      generating simulated high frequencies from the horizontal-low frequencies, and
      subtracting the simulated high frequencies subtracted from the horizontal high frequencies to generate a horizontal support signal;
   wherein the preprocessing in the vertical dimension comprises:
      separating even and odd lines of the video signal and eliminating one line out of two,
      outputting the information-reduced signal comprising the even lines, and outputting a vertical filtered component comprising the odd lines;
      generating simulated odd lines from the even lines, and subtracting the simulated odd lines from the odd lines to generate a vertical support signal;
   wherein the preprocessing in the temporal dimension comprises:
      separating even and odd frames of the video signal to process the video signal in a time domain,
      outputting the information-reduced signal comprising the even frames, and outputting a temporal filtered component comprising the odd frames;
      generating simulated odd frames from the even frames, and
      outputting a temporal support signal generated by subtracting the simulated odd frames subtracted from the odd frames;
   and
   outputting the information-reduced signal, the temporal support signal and at least one of the horizontal support signal and the vertical support signal such that less overall information is output than the video signal.

2. The method of claim 1, further comprising: at least of storing and transmitting the information-reduced signal and the support signals.

3. The method of claim 2, further comprising: during post processing, combining the information-reduced signal and the support signals to generate a full information duplicate of the video signal.

4. The method of claim 3, further comprising using the information-reduced signal to generate the simulated filtered components, and combining the simulated filtered components with the support signals to generate the full information duplicate of the video signal.

5. The method of claim 1, wherein preprocessing the video signal further comprises: performing any combination of at least one of horizontal filtering and vertical filtering, and performing temporal filtering on the video signal in series and in any order.

6. The method of claim 5, wherein the combination of horizontal, vertical, and temporal filtering produces corresponding horizontal, vertical and temporal filtered components that are separated from the video signal.

7. The method of claim 5, further comprising: using the information-reduced signal to generate corresponding simulated horizontal, vertical and temporal filtered components, and generating a corresponding horizontal support signal, a vertical support signal, and a temporal support signal based on a difference between the corresponding horizontal, vertical and temporal filtered components and the corresponding simulated horizontal, vertical and temporal filtered components, respectively.

8. The method of claim 7, further comprising: encoding and sending the information-reduced signal and the corresponding horizontal support signal, the vertical support signal, and the temporal support signal to a storage/transmission path.

9. The method of claim 8, further comprising: accessing and decoding the information-reduced signal and the corresponding horizontal support signal, the vertical support signal, and the temporal support signal from the storage/transmission path.

10. The method of claim 9, further comprising a postprocessing process comprising:
   using the information-reduced signal to generate at least two corresponding simulated horizontal, vertical and temporal filtered components;
   combining the simulated horizontal, vertical and temporal filtered components with the corresponding horizontal support signal, the vertical support signal, and the temporal support signal to obtain estimated filtered components; and
   adding the estimated filtered components to the information-reduced signal to generate a full information duplicate copy of the video signal.

11. The method of claim 10, wherein the postprocessing performs a same combination of horizontal, vertical, and temporal processing as performed during the preprocessing, but in reverse order.

12. The method of claim 1, wherein generating support signals in the vertical dimension further comprises at least one of: separating even and odd lines from the video signal, and separating high and low vertical frequencies from the video signal.

13. A system for multidimensional video processing, comprising:
   a memory; and
   at least one preprocessor coupled to the memory configured to:
   preprocess a video signal in at least one of a horizontal dimension and a vertical dimension, and preprocessing the video signal in a temporal dimensions to reduce an amount of information of the video signal to obtain an information-reduced signal and filtered components that are separated from the video signal; and
   use the information-reduced signal to generate simulated filtered components, and generate support signals based on a difference between the filtered components and the simulated filtered components;
   wherein the preprocessing in the horizontal dimension comprises:
      separating horizontal high and low frequencies from the video signal by horizontally low-pass filtering the video signal,
      outputting the information-reduced signal as horizontal-low frequencies, and outputting a horizontal filtered component comprising horizontal-high frequencies,
      generating simulated high frequencies from the horizontal-low frequencies, and
      subtracting the simulated high frequencies subtracted from the horizontal high frequencies to generate a horizontal support signal;
   wherein the preprocessing in the vertical dimension comprises:
      separating even and odd lines of the video signal and eliminating one line out of two,
      outputting the information-reduced signal comprising the even lines, and outputting a vertical filtered component comprising the odd lines;
      generating simulated odd lines from the even lines, and subtracting the simulated odd lines from the odd lines to generate a vertical support signal;
   wherein the preprocessing in the temporal dimension comprises:
      separating even and odd frames of the video signal to process the video signal in a time domain,
      outputting the information-reduced signal comprising the even frames, and outputting a temporal filtered component comprising the odd frames;
      generating simulated odd frames from the even frames, and
      outputting a temporal support signal generated by subtracting the simulated odd frames subtracted from the odd frames;
   and
   outputting the information-reduced signal, the temporal support signal and at least one of the horizontal support signal and the vertical support signal such that less overall information is output than the video signal.

14. The system of claim 13, further comprising: at least one of store and transmit the information-reduced signal and the support signals.

15. The system of claim 14, further comprising a postprocessor that receives and combines the information-reduced signal and the support signals to generate a full information duplicate of the video signal.

16. The method of claim 15, wherein the information-reduced signal is used to generate the simulated filtered components, and the simulated filtered components are combined with the support signals to generate the full information duplicate of the video signal.

17. The system of claim 13, wherein the preprocessor performs any combination of at least one of horizontal filtering and vertical filtering, and performing temporal filtering on the video signal in series and in any order.

18. The system of claim 17, wherein the combination of horizontal, vertical, and temporal filtering produces corresponding horizontal, vertical and temporal filtered components that are separated from the video signal.

19. The system of claim 17, wherein the preprocessor uses the information-reduced signal to generate corresponding simulated horizontal, vertical and temporal filtered components, and generates a corresponding horizontal support signal, a vertical support signal, and a temporal support signal based on a difference between the corresponding horizontal, vertical and temporal filtered components and the corresponding simulated horizontal, vertical and temporal filtered components, respectively.

20. The system of claim 19, wherein the preprocessor encodes and sends the information-reduced signal and the corresponding horizontal support signal, the vertical support signal, and the temporal support signal to a storage/transmission path.

21. The system of claim 20, further comprising a decoder, wherein the decoder accesses and decodes the information-reduced signal and the corresponding horizontal support signal, the vertical support signal, and the temporal support signal from the storage/transmission path.

22. The system of claim 21, further comprising a postprocessor coupled to the decoder configured to:
   use the information-reduced video signal to generate at least two corresponding simulated horizontal, vertical and temporal filtered components
   combine the simulated horizontal, vertical and temporal filtered components with the corresponding horizontal support signal, the vertical support signal, and the temporal support signal to obtain estimated filtered components; and
   add the estimated filtered components to the information-reduced signal to generate a full information duplicate copy of the video signal.

23. The system of claim 22, wherein the postprocessor performs a same combination of horizontal, vertical, and temporal processing as performed by the software preprocessor, but in reverse order.

24. The system of claim 13, wherein the preprocessor is configured to generate the support signals in the vertical dimension by at least one of: separating even and odd lines from the video signal, and separating high and low vertical frequencies from the video signal.

25. A method for multidimensional postprocessing, comprising:
    receiving an information-reduced signal, the information-reduced signal having been generated by a preprocessor that processed a video signal in at least two of horizontal, vertical and temporal dimensions of the video signal to reduce an amount of information of the video signal to obtain the information-reduced signal and filtered components that are separated from the video signal; and
    using the information-reduced signal to generate the simulated filtered components, and then combining the simulated filtered components with the support signals to generate the full information duplicate of the video signal;
    wherein the preprocessing in the horizontal dimension comprises:
        separating horizontal high and low frequencies from the video signal by horizontally low-pass filtering the video signal,
        outputting the information-reduced signal as horizontal-low frequencies, and outputting a horizontal filtered component comprising horizontal-high frequencies,
        generating simulated high frequencies from the horizontal-low frequencies, and
        subtracting the simulated high frequencies subtracted from the horizontal high frequencies to generate a horizontal support signal;
    wherein the preprocessing in the vertical dimension comprises:
        separating even and odd lines of the video signal and eliminating one line out of two,
        outputting the information-reduced signal comprising the even lines, and outputting a vertical filtered component comprising the odd lines;
        generating simulated odd lines from the even lines, and subtracting the simulated odd lines from the odd lines to generate a vertical support signal;
    wherein the preprocessing in the temporal dimension comprises:
        separating even and odd frames of the video signal to process the video signal in a time domain,
        outputting the information-reduced signal comprising the even frames, and outputting a temporal filtered component comprising the odd frames;
        generating simulated odd frames from the even frames, and
        outputting a temporal support signal generated by subtracting the simulated odd frames subtracted from the odd frames;
    and
    outputting the information-reduced signal, the temporal support signal and at least one of the horizontal support signal and the vertical support signal such that less overall information is output than the video signal.

26. The method of claim 25, wherein combining the information-reduced signal and the support signals further comprises: performing a same combination of horizontal, vertical, and temporal processing as performed by the preprocessor, but in reverse order.

* * * * *